United States Patent [19]
Balderson

[11] 3,915,079
[45] Oct. 28, 1975

[54] AUTO-COFFEE
[76] Inventor: William H. Balderson, 1252 Horseshoe Road, Delaware, Ohio 43015
[22] Filed: Mar. 14, 1974
[21] Appl. No.: 451,226

[52] U.S. Cl. ............................... 99/281; 219/432
[51] Int. Cl.² ........................................ A47J 31/00
[58] Field of Search ............. 99/279, 281, 282, 283, 99/284, 280; 219/202, 432, 307–315

[56] References Cited
UNITED STATES PATENTS

| | | | |
|---|---|---|---|
| 2,759,091 | 8/1956 | Kolberg | 219/432 |
| 2,813,537 | 11/1957 | Lind | 219/202 |
| 2,863,037 | 12/1958 | Johnstone | 219/432 |
| 3,423,571 | 1/1969 | Trachtenberg | 219/202 |
| 3,692,975 | 9/1972 | Markus | 219/202 |

*Primary Examiner*—Robert W. Jenkins

[57] ABSTRACT

An electrical appliance for installation within an automotive vehicle for preparing coffee and keeping it hot, whereby travelers may drink it at any time while the car is either traveling or stopping; the appliance comprising a stove unit securable on a floor of the vehicle and which is plugged to the cigarette lighter receptacle, and an electric coffee pot having a heating coil and switch, the coffee pot fitting inside a well upon the stove unit to prevent the pot from falling over, and the pot being electrically connected to the unit by prongs under the pot engaging a female electrical receptacle in the bottom of the well.

1 Claim, 2 Drawing Figures

U.S. Patent    Oct. 28, 1975    3,915,079
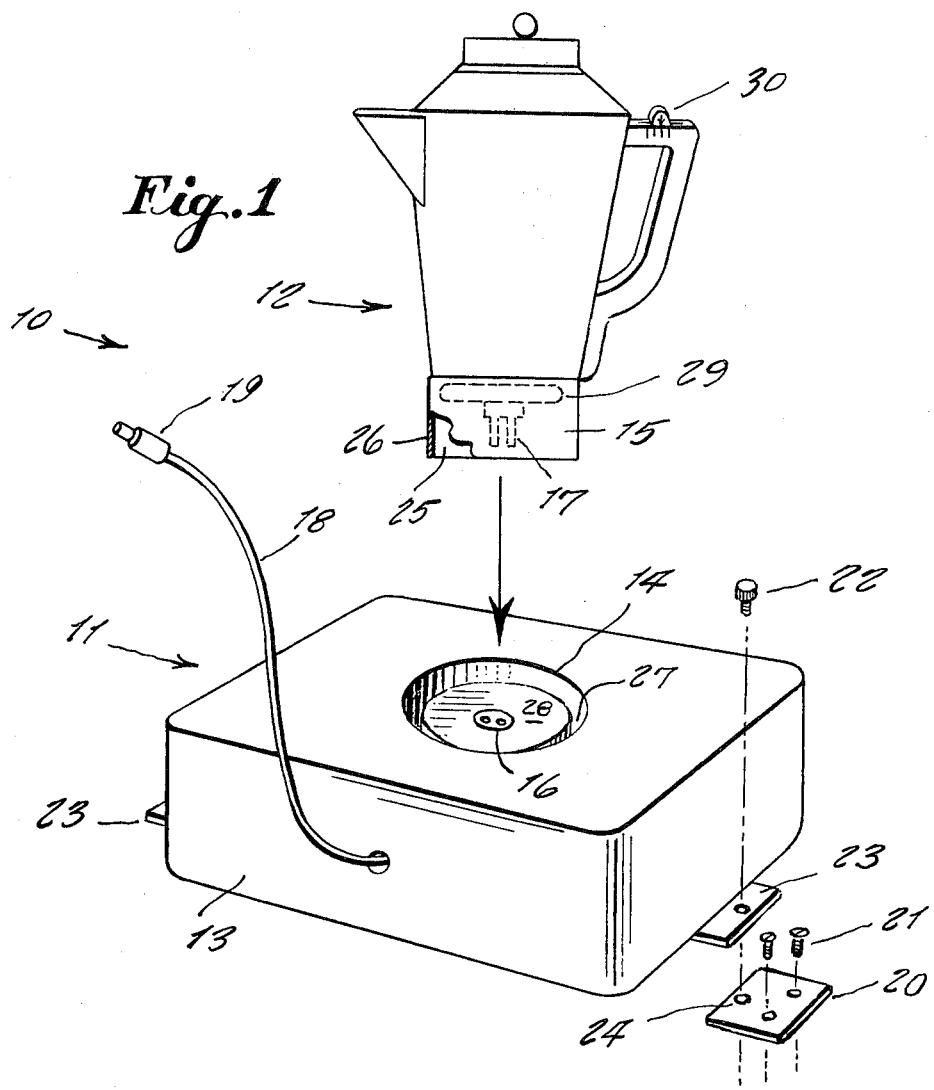
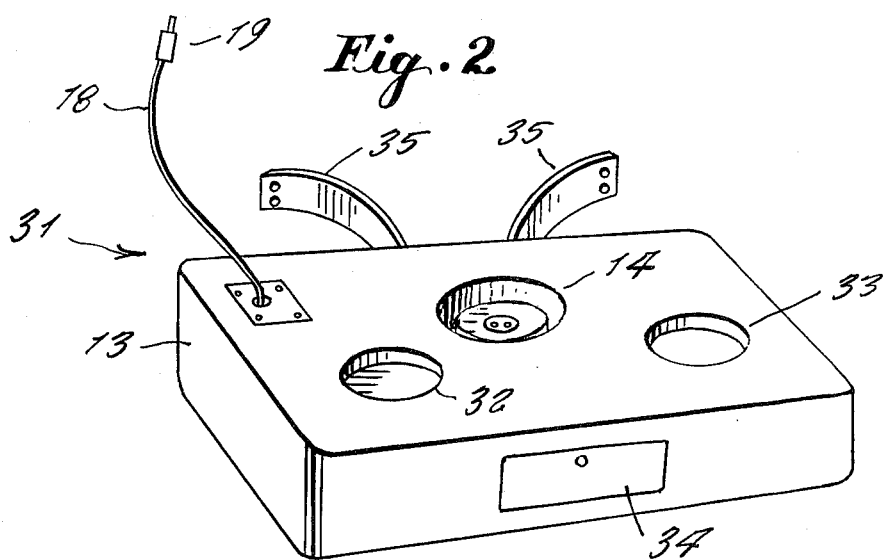

AUTO-COFFEE

This invention relates generally to automotive accessories. More specifically it relates to portable electrical appliances.

A principal object of the present invention is to provide a coffee maker design particularly for use in an automobile so travelers can have a cup of coffee at any time while traveling or stopping.

Another object is to provide an automobile coffee maker which can be readily installed in any vehicle, and which is designed to prevent a coffee pot from falling and spilling while the vehicle is in motion.

Other objects are to provide an automobile coffee maker which is simple in design, inexpensive to manufacture, rugged in construction, easy to use, and efficient in operation.

These and other objects will be readily evident upon a study of the following specification and the accompanying drawing, wherein:

FIG. 1 is a perspective view of the invention.

FIG. 2 is a perspective view of a modified design of the stove unit thereof.

Referring now to the drawing in detail, and more particularly to FIG. 1 thereof at this time, the reference numeral 10 represents an auto-coffee according to the present invention, wherein there is a stove unit 11 upon which there is placeable a coffee pot 12.

The unit 11 essentially serves as a stationary base for the pot. It includes an attractive housing 13 made of polished metal, and has a well 14 on top into which the lower end 15 of the coffee pot slidably fits so to prevent the pot from tipping over or falling off. In the bottom of the well there is a female electrical receptacle 16 for engaging male prongs 17 on the underside of the coffee pot. The female receptacle is connected to an electric cord 18 that at its outer end has a plug 19 that is receivable within a cigarette lighter receptacle of a vehicle.

The unit 11 is anchored to a floor of the vehicle by any practical manner such as by the example illustrated in FIG. 1, wherein small plates 20 of unobtrusive size are anchored by screws 21 to a floor, and a removable thumb screw 22 fitted through a lug 23 (attached to a bottom of unit 11) is then screwed into a threaded hole 24, so that the stove unit can be easily and quickly, without any tools, installed or removed, as wanted.

The coffee pot prongs 17 are located within a hollow space 25 formed under the pot by a circular, downward, peripheral flange 26, so that the prongs do not interfere in case the pot is rested upon any flat surface while being used. At such time the pot rests on the flange lower edge.

A peripheral groove 27 extends downwardly around the well bottom surface 28 of the stove unit so to allow the flange to slide inside the groove, and thus let the prongs come sufficiently downward so to engage the receptacle 16.

The coffee pot has a built in electric heating coil 29 in its bottom so to brew coffee. The heating coil is in a circuit with an adjustable thermostat switch 30 for keeping the coffee hot after it is made. The switch 30, alternately can be made in the stove unit, if so preferred by a manufacturer.

The modified design of stove unit 31 shown in FIG. 2, additionally includes a well 32 for sugar bowl, a well 33 for cream and a door-closable compartment or drawer 34 for holding spoons or stir sticks. Anchor straps 35 with metal screws show another method of securing the device to the car floor.

Thus different forms of the invention are shown.

I claim:

1. A coffee maker designed for use in an automotive vehicle comprising:
    a. a coffee pot including
        1. an electric heating coil attached to and located in the bottom of said coffee pot;
        2. at least two electrical male prongs attached to the bottom of said coffee pot and electrically connected with said heating coil;
        3. a circular peripheral flange extending downwardly from the bottom of said coffee pot, said flange enclosing said prongs and said heating coil and extending in length slightly beyond said prongs and said heating coil;
    b. a stove unit, said stove unit having a well therein and a peripheral groove extending downwardly from and around said well said well and groove adapted to receive the bottom of said coffee pot and said circular peripheral flange, said stove unit including
        4. a female electrical receptacle adapted to engage said male prongs;
        5. an electric cord electrically connected at one end to said female receptacle and electrically connected at its other end with a plug adapted to fit within a cigarette lighter receptacle in said vehicle;
        6. means for anchoring said stove unit to the floor of said vehicle; and
    c. an adjustable thermostat electrically connected with said heating coil.

* * * * *